United States Patent [19]
von Braun

[11] Patent Number: 5,555,018
[45] Date of Patent: Sep. 10, 1996

[54] LARGE-SCALE MAPPING OF PARAMETERS OF MULTI-DIMENSIONAL STRUCTURES IN NATURAL ENVIRONMENTS

[76] Inventor: Heiko S. von Braun, Tankenrain Salzgruben 2, Weilheim D-8120, Germany

[21] Appl. No.: 270,421

[22] Filed: Jul. 5, 1994

Related U.S. Application Data

[63] Continuation-in-part of Ser. No. 573,022, Apr. 25, 1991, abandoned.

[51] Int. Cl.$^6$ .................................................. H04N 7/18
[52] U.S. Cl. ................................... 348/144; 348/147
[58] Field of Search .............................. 348/144, 147; H04N 7/18

[56] References Cited

U.S. PATENT DOCUMENTS

| | | | |
|---|---|---|---|
| 5,028,998 | 7/1991 | Westell | 348/147 |
| 5,353,055 | 10/1994 | Hiramatsu | 348/144 |

FOREIGN PATENT DOCUMENTS

| | | |
|---|---|---|
| 453725 | 12/1927 | Germany . |
| 2519241 | 11/1976 | Germany . |
| 449405 | 4/1968 | Switzerland . |

OTHER PUBLICATIONS

Photo–Technik Und Wirtschaft Nr. 4 1972, pp. 92, 94–96 *Moderne photographic Fernerkundungsverfahren im Dienst de Unweltforshung*.

*Primary Examiner*—Howard W. Britton
*Attorney, Agent, or Firm*—Lahive & Cockfield

[57] ABSTRACT

Method for the large-scale mapping of parameters of multi-dimensional structures in natural environments or ranges. According to the invention, the range to be subjected to mapping or sections thereof are detected during first picture-taking flights at flight altitudes between about 150 m to 500 m above ground by means of series aerial surveying pictures taken by reconnaissance cameras (2) in combination with tele-cameras (3) for making detailed images from the range section covered by said reconnaissance cameras 2. The series aerial surveying pictures are set with respect to their position in the range by means of orientation aids and evaluated using photogrammetric techniques. The range data obtained of a structure are assigned to the coordinates of the structure in the range for selective retrieval.

22 Claims, 3 Drawing Sheets

LARGE-SCALE MAPPING OF PARAMETERS OF MULTI-DIMENSIONAL STRUCTURES IN NATURAL ENVIRONMENTS

This application is a continuation-in-part of Ser. No. 07/573,022, filed on Apr. 25, 1991, now abandoned.

The present invention relates to a method for the large scale mapping of parameters of multi-dimensional structures in natural environments, and to a photographic aircraft which is particularly suited for carrying out said method.

Experts in a variety of fields are interested in obtaining comprehensive information on conditions in natural environments or ranges, which may be processed further to serve as a basis for inventories, schemes or predictions on future changes in such ranges.

By "natural environment" the living space or 'lebensraum' of the human being on the earth's surface is meant, including the solum and the atmosphere enlivened with plants, and the external influences with their effects on this natural environment. The mapping of the natural environment or range is an ecological mapping of the world-wide human 'lebensraum' and the hazards involved with use by humans within the limits and possibilities described by the methodology.

As a very recent example the 'waldsterben' inventory may be mentioned on the one hand, which must be made at certain intervals in order to render visible any changes during a particular period of time, which inventory is to serve as a basis for decisions when having to take countermeasures. In the Alps, in addition, the condition of the slopes is of primary interest, as certain parameters, such as the density of vegetation, the species of the plants and tress growing there, the health condition of these plants, the permeability to humidity of the individual layers of the earth, etc. are an indicium for the expert as to future developments, such as slipping slopes and gravel avalanches.

Also for the planning of interventions in a rangeland a comprehensive knowledge of the prevailing conditions is indispensable. Prior to revegetating, the quality of the soil and the humidity have to be checked, for instance, so as to be able to make the correct choice as to what is to be planted.

In the case of very large areas of rangeland, mapping from the air will be preferable—considering time—as mapping processes on the ground inevitably will permit covering only very small sections, respectively, of an area of rangeland, and are moreover time-consuming. Such mapping from the air for the purposes of detecting environmental parameters with the help of a photographic aircraft equipped with a reconnaissance camera is known from the article "Moderne photographische Fernerkundungsverfahren im Dienste der Umweltforschung by S. Schneider in Photo-Technik und -Wirtschaft, No. 4, volume 23, April 1972, pages 92–96.

Using the example of an inventory of damages done to forests another conventional proceeding in air mapping is as follows.

In this method picture-taking techniques are employed which, in a very similar form, are already known from aerophotogrammetry, where they are used for surveying the surface of the earth. As this is being done, the photographic aircraft flies over an area that is to be surveyed at an altitude of, as a rule, 1000 m above the ground surface, whilst with the aid of a series surveying camera directed vertically downwardly partially overlapping photogaphs are taken which are subsequently surveyed.

So far, although normal aerial photographs have permitted good space and inventory planning, a detailed identification, for instance a specific identification of tree species, the measuring of heights and thicknesses of individual trees or the surveying of conditions in a particular place, was not possible because of scale conditions (maximally 1:2000). The main reconnoitering work still had to be done on the terrain, involving much time and high costs whilst producing the typical error rate. The data obtained by this technique in most cases is not reproducible. A survey of whole areas right down to details having a size of only one centimeter was not even to be considered when it was a question of covering some 100,000 ha per year. However, precisely this is required in view of the rapidly progressing changes in the environmental main indicator 'wood' for any ecological long- and short-time analyses.

With the help of infrared false colour films it is possible to clearly discern dry foliage from green succulent foliage. This permits distinguishing in wood areas between tress that have already died off and healthy ones which would not be recognizable any more from this height on a film having a spectral sensitivity which corresponds to that of the human eye. Such false colour infrared films are very expensive and difficult to handle. Furthermore, the usual flying height in aerophotogrammetry requires sufficiently clear weather conditions and a high position of the sun (summer), which must be taken into account in planing the duration of such an inventory. Altogether, this method for the mapping of damage to forests may be described as being comparatively costly and lengthy—as a result of its dependence on the weather. This is diametrically opposed to the acute need for information in this specific field.

Although the use of infrared and infrared false colour films considerably increases the possibility of gathering details from higher altitudes, there are some limitations due to the requirement for absolutely perfect weather conditions at the times when the solar year is at its highest, so that the period of operation is limited to about six weeks per annum and all aircraft of a particular area must permanently be ready during this period in order to permit making any statements on large areas following evaluation at all. Six weeks of rain are by all means possible during the time when the sun is in its highest position, so that flights and evaluation cannot be calculated economically. Moreover, the price of a developed infrared false colour film is about ten times higher than that of a black-and-white film with a higher resolution. Additionally, the emulsion of a false colour film is considerably more sensitive to storage conditions than that for a black-and-white film. The requirements for handling a false colour film are considerably higher as concerns film measuring before take-off, and also for further processing during developing. Thus, from experience, with a few exceptions, photo-laboratories are not in a position to produce identical colour temperatures of identical objects over many years. This, however, is a decisive requirement for the information an infrared false colour film may have.

In certain analyses there also may be used an electron scan process which is connected with the aid of a photographic aircraft, wherein merely the picture-taking camera is replaced by an electronic reflectance detector.

The scanning method of large wooded areas results in a wide field of electronically automated image processing operations yielding very interesting individual results. These, however, can be taken care of only by expert personnel when data is to be obtained on areas that is to be exploited for forestry in practice, as this personnel must be capable of coping with the two subjects (practical forestry—scanning technology) equally well. This requirement cannot be complied with at present.

Hence, this method, too, has the disadvantages of the above-described process as far as costs and time are concerned, the latter factor being more critical still in that for implementing the electron scanning process a certain position of the sun is required, which enables trouble-free surveyance only during a few days of the year.

In addition, although with the method mentioned above a number of parameters may be made clearly visible other parameters cannot be made visible with this method. Thus, for example, resolution of the films used at the altitude mentioned does not suffice as a rule to safely distinguish certain species of trees or to make detailed statements on the geological conditions in this environment.

It is an object of the present invention to indicate a method for the large-scale mapping of parameters of multi-dimensional structures in natural environments as well as a photographic aircraft that is particularly suited for carrying out said method, in that it permits mapping of such ranges at a favourable price and wholly within a short period of time with respect to a large number of detectable parameters of multi-dimensional structures.

This problem is solved as set forth in the claims.

The mapping method according to the invention starts from the following basic idea:

Picture-taking flights which are performed for surveying purposes regularly take place at comparatively great heights, ranging between some 1000 and 3000 m above ground, as under these circumstances the image distortions occurring at the margin of every photograph can be kept low. Furthermore, the sections on the earth's surface covered per photograph are comparatively large so that large areas can be surveyed comparatively quickly to the precise point. The techniques so far employed to render certain structures on the earth's surface visible have apparently adopted without any criticism the aerogrammatic photographic flight methods, and in particular also their flight heights, in an attempt to render the structures of interest visible by the use of a specific film material. It is obvious that this method reaches its boundaries whenever parameters of structures are to be covered which cannot be brought out selectively because of certain properties of the film material. On the other hand, resolution of stereo-photographs taken from a great height is very limited in vertical direction. Now, if one changes over from the usual flight heights in photogrammetry to considerably lower flight heights, this results in a number of consequences which have to be weighed one against the another. On the one hand, resolution of the photographs increases so that the structures of interest may be read off from the pictures directly without any specially prepared film material being necessary to this end. As a result thereof, instead of the, for example, very expensive infrared false colour films, comparatively inexpensive black-and-white films may be used, on which the expert may readily discern whether the foliage of trees that have been photographed is dried out or not. Furthermore, plant species may be distinguished which on a false colour film would have produced merely areas of identical colour. From the fact that in particular areas particular species of plants are growing the expert, in turn, can draw conclusions as to the soil condition and humidity.

On the other hand, at such low flight height the projective influences on the photographs increase, leading to distortions. These distortions, however, can be tolerated as long as it is possible to clearly associate the photograph with a particular section of a range, for example with the Gauss-Krüger net (coordinate grid). In the fields of application of the method according to the invention, however, it is primarily a question of performing large-scale relative surveying of structures, and not of performing an all-round survey of a range as such. This has the further consequence that the photographic flights performed in the method according to the invention do not have to meet such severe requirements for orientation of the aircraft as is the case with aerophotogrammetric land surveying procedures.

Furthermore, the low flight altitude according to the invention permits picture taking at a low angle of inclination relative to the horizontal from the aicraft without the image widths becoming so large that structures of interest cannot be resolved any more. The combination of at least two of such pictures taken laterally from the aircraft at different angles of inclination and directed to the same structures, respectively, facilitates comprehensive viewing of the structures of interest so that parameters such as heights and thicknesses of trees can be read from the combination of different pictures, which cannot be detected with the conventional mapping methods.

Hence, this partial aspect, relating to the picture-taking technique, allows working with comparatively cheap film material and to perform photographic flights where the requirements on aircraft equipment are low whilst evaluation of the pictures is not affected. The low flight height has the further advantage that the dependence on weather conditions is not as high as with photographic flights that take place at great altitudes. Any weather, especially a clouded sky, is good enough for taking a photograph as long as visibility is at least equal to the picture-taking device.

Evaluation of the pictures taken in this way comprises the following steps:

Assuming that the section of the range in which parameters of structures of interest are to be evaluated has been surveyed, the photographs to be evaluated—in a first step—are set with respect to their position in the range concerned, for example in the Gauss-Krüger net. Preferably a computer produces a perspective view of the surface of the earth with the section of interest, using an input topographic map of the section of the range of interest. With the aid of a photogrammetric evaluation device the coordinates of a structure of interest are determined, and the parameters of relevance of this structure are directly taken from what is shown on the photograph or from a digitalized form of the picture and surveyed, respectively. The values of the parameters are input into the computer under the address of the coordinate determined of the structure of interest for storage in a memory from which the parameters may be read selectively.

In this way particular groups of parameters or particular structures can be interrogated separately from one another, and there can be produced statistics, maps or charts dealing with individual parameter groups selectively in each case, or in which such parameter groups are combined.

This evaluation technique has the following great advantages:

1. Evaluation of the black-and-white image material is based on identification of structures and the parameters thereof in a form in which the human eye also sees it in Nature. The large-scale pictures permit an identification of details corresponding to the condition a "scientist is in when measuring the object on the site". This means that evaluation may be performed by persons who, although being experts with respect to the structures of interest to them, are no specialists at evaluating specific photographs, as is required for infrared false colour pictures and electron scan images. When it is a question, for instance, of judging the condition of a wood or forest a forest expert will take care of evalutation of the pictures without him having to receive any special instructions to this end.

2. The large-scale photographs are evaluated by experts of the respective structures by measuring. This means that the evaluation results are reproducible at any time and that, moreover, the data memory exlusively contains reproducible data of relevance in the particular field, and in a spatially oriented form. This absolutely first-class data material complies with any statistic requirements and permits interlinkage also of data of various structures falling within different fields, so as to be able to give field-overlapping answers. This is absolutely indispensible in order to be able to work on complex processes and to give satisfactory answers to such complex questions.

3. The assigning of the parameters detected of a structure of interest to the coordinates of the structure in the range and the storage thereof in a computer facilitate the selective reading of particular parameter classes for a range section so that, again, to the non-expert in the field of evaluation of aerial photographs the desired information can be made accessible in a well comprehensible and graspable way.

4. The selectively retrievable assignment of different parameters to the coordinates of the structures of interest in the range facilitates the dialogue of experts from various fields, which is an indispensible necessity when it comes to solving, for example, problems concerning environmental damage done to ranges.

In the following the invention is described in more detail with reference to preferred embodiments and to the drawing.

Figure 1:
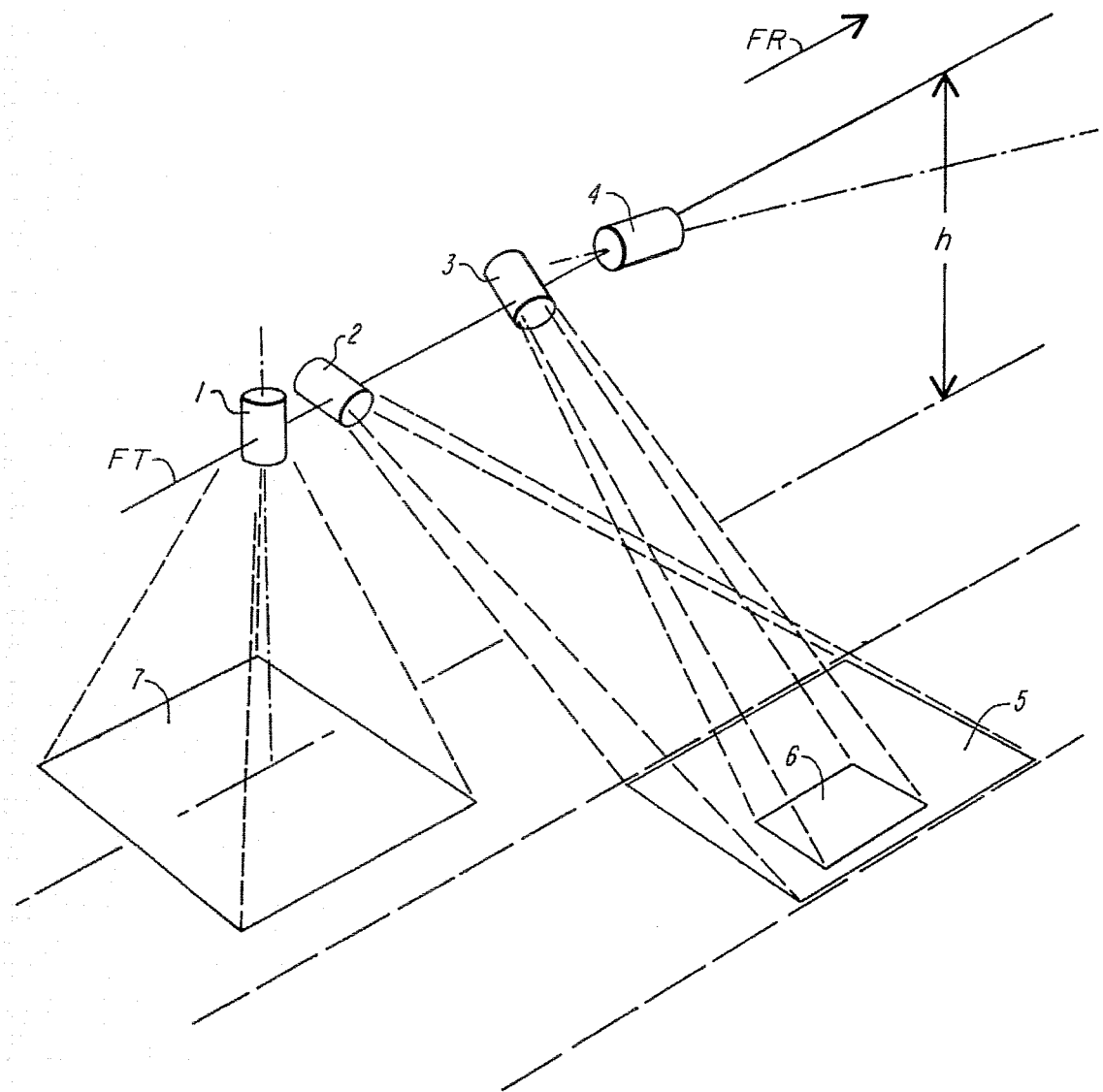
FIG. 1 is a schematic view of the orientation of the individual picture-taking cameras and of the video finder, respectively, in a photographic aircraft.

In FIG. 1 a flight track FT has been plotted on which three cameras and a video detection camera are shown. The arrow FR points in the flying direction. The photographic aircraft itself is not shown in the drawing for reasons of simplification. The flight track is at a constant height h above ground to the extent to which the condition of the surface of the range permits it. In a very mountainous area a powerful photographic aircraft (profile flying) is required in order to maintain a height which is as constant as possible. This is in particular so if valleys are to be flown over in transverse direction to their longitudinal extension.

From left to right the flight track (FT) shows the following:

A series surveying camera 1 oriented vertically downwardly, a wide-angle reconnaissance camera 2 inclined laterally downwardly transversely of the direction of flight, a tele-camera 3 having about the same orientation as the wide-angle reconnaissance camera 2, and a video camera 4 oriented diagonally downwardly in the direction of flight.

Like the wide-angle reconnaissance camera and the tele-camera, the series surveying camera 1 is equipped with a black-and-white film for taking series of aerial photographs whose time sequence is triggered with the picture-taking instants of the cameras 2 and 3, and which are intended for orienting respectively position determining the structures photographed in the range. The photos are evaluated in accordance with the techniques known from aero-photogrammetry.

The wide-angle reconnaissance camera 2 is a wide-angle camera having an aperture angle of up to 180°, which is oriented laterally outwards and diagonally downwards from the aircraft as well as transversely of the direction of flight. The reconnaissance camera 2 is directed to a section 5 of the range in which structures of interest occur. This may, for instance, be a wood whose trees are to be examined. With the aid of the tele-camera 3, which can be adjusted in the picture-taking direction during the flight, partial sections 6 of the photographed sections 5 of the reconnaissance camera that are of particular interest may be reproduced in enlarged form so as to be able to better evaluate individual parameters of the structures of interest. Thus, for instance, the tele-camera 3 can be directed to the edges of clearings or woods in order to obtain lateral photographs of trees, permitting statements on the sizes of the trees and the thicknesses of their trunks.

Both the reconnaissance camera 2 and the tele-camera 3 are adjustable within certain limits relative to the angles they are defining with the direction of flight, so that series aerial surveying pictures may be taken from at least two different photographic directions, transversely of the flying direction. Furthermore, also their inclination relative to the horizontal may be chosen freely, so that also here, in the case of suitable structures, aerial photographs may be taken at two different angles by flying over the section of interest of the range twice.

There are limits to the angles at which the reconnaissance camera 2 and the tele-camera 3 are oriented relative to the vertical, the horizontal and the direction of flight due to restrictions in the evaluation technique, which limits are reached if distortions of the structures of interest on account of the perspective photograph cannot be compensated any more arithmetically. This is particularly true of photographs that are taken laterally from the aircraft both diagonally downwardly and transversely of the direction of flight diagonally forwardly or diagonally backwardly.

Conveniently, the surveying cameras 1 to 3 are equipped with devices for the automated measuring of the object distances and the aircraft speed and for adjusting the camera objectives accordingly. To this end, radar distance meters as used in aerophotogrammetry are particularly suited. Such automated camera adjusting is important in particular if small mountain valleys have to be flown through at a low altitude and the lateral distance between the mountain slopes and the flight track changes greatly in rapid succession.

A video camera system 4 comprising one to four video cameras is oriented diagonally downwardly in the direction of flight and is preferably provided with a panorama optics, so that on a monitor screen the examinable "field of vision" of the aerial photographic optics may be reproduced. Simultaneously, the view taken by the video camera can be recorded on tape, which may accelerate the later locating of certain picture sequences and picture data with orientations on evaluation. During the picture-taking flight, the person handling the photographic cameras can observe on the monitor when and where structures of interest come into the field of vision of the reconnaissance and of the tele-camera, respectively. In order to facilitate such orienting of the reconnaissance camera 2 and the tele-camera 3 to structures of interest, a system is preferably provided which is coupled to the suspension of each one of the cameras, enabling display of the projections of the flight track (10) extended in the direction of flight and of the image sections (11, 12) detected with the aid of the reconnaissance camera respectively the tele-camera at their current orientation.

Figure 2:
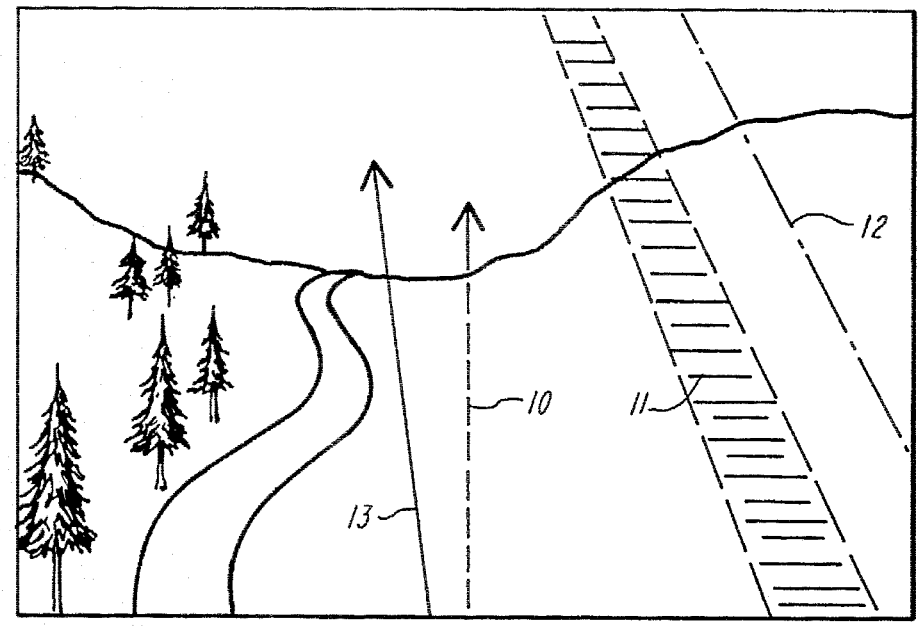
FIG. 2 shows the cross-faded orientation aids on the display screen of a video finder system.

FIG. 2 is a schematic view of these orientation aids in the panorama picture as taken by the video camera. The broken-line arrow 10 shows the position of the vertical projection of the flight track FT on the surface of the range being flown over, and the somewhat broader band 11 indicates the section which comes into the field of vision of the reconnaissance camera 2 thereafter if the direction of flight is maintained. The dash-dotted line 12 shows the line which lies in the field of vision of the tele-camera 3 at its current position, provided the direction of flight is maintained. Furthermore, the desired route from the flight schedule is shown on the screen as a line 13.

In order to provide a complete documentation on the parameters of a section of interest of a range, this partial section is covered in a first picture-taking flight from at least two different image taking directions, transversely of the direction of flight. This can be done by arranging a plurality of reconnaissance respectively tele-cameras in inclined fashion transversely of the direction of flight diagonally downwardly and diagonally forwardly respectively diagonally backwardly relative to the direction of flight. To facilitate the reconnoitering of details of structures of interest, a second picture-taking low altitude flight close to the ground is performed which makes it possible to take photographs having imaging scales of 1:1600 and larger. It has turned out that with the help of such photographs where comparatively low-price black-and-white films are used such fine structures can be evaluated on the pictures with the naked eye that even certain types of grasses can be discerned.

Figure 3:
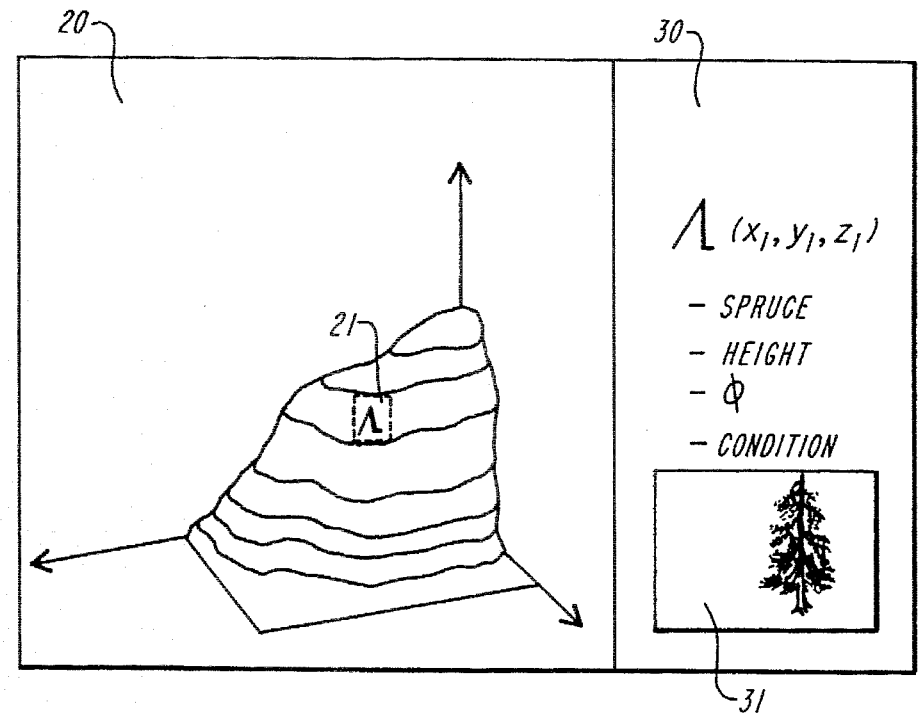
FIG. 3 shows an information plate for display on a computer screen, exhibiting particular data assigned to a coordinate of a structure of interest.

Evaluation of the image material provided in this way has been briefly explained above. FIG. 3 shows as result of such evaluation the visual representation of such parameters in a section of a range. In field 20 on the screen one recognizes the perspective image of a section of a range that has been produced by a computer with the aid of a topographic map. When evaluating the aerial photographs obtained according to the invention structures of interest first were analyzed with respect to their coordinates and subsequently evaluated. In field 20 the symbol 21, which represents a tree, indicates that in this location of the range the aerial photographs show a tree of interest whose parameters of interest are shown in field 30 on the screen; there, for instance, the tree species is listed; the trunk diameter; the length of the tree; any indication of a disease as well as the condition of the soil in the more immediate environment of the tree. Furthermore, a sectional reproduction of an aerial photograph 31 is intended which has been digitalized on evaluation and is now stored in the computer.

To the coordinates X, Y, Z in the range further structures may be assigned which may be stored and selectively retrieved instead of the parameters shown. These may be, for instance, meterological data, geological data or the like.

As concerns rendering the evaluated data visible a great many variations to the exemplary embodiment shown in FIG. 3 are possible. What is essential solely is the selectively retrievable assignment of various parameter groups which are assigned to a coordinate of a structure in the range.

Figure 4:
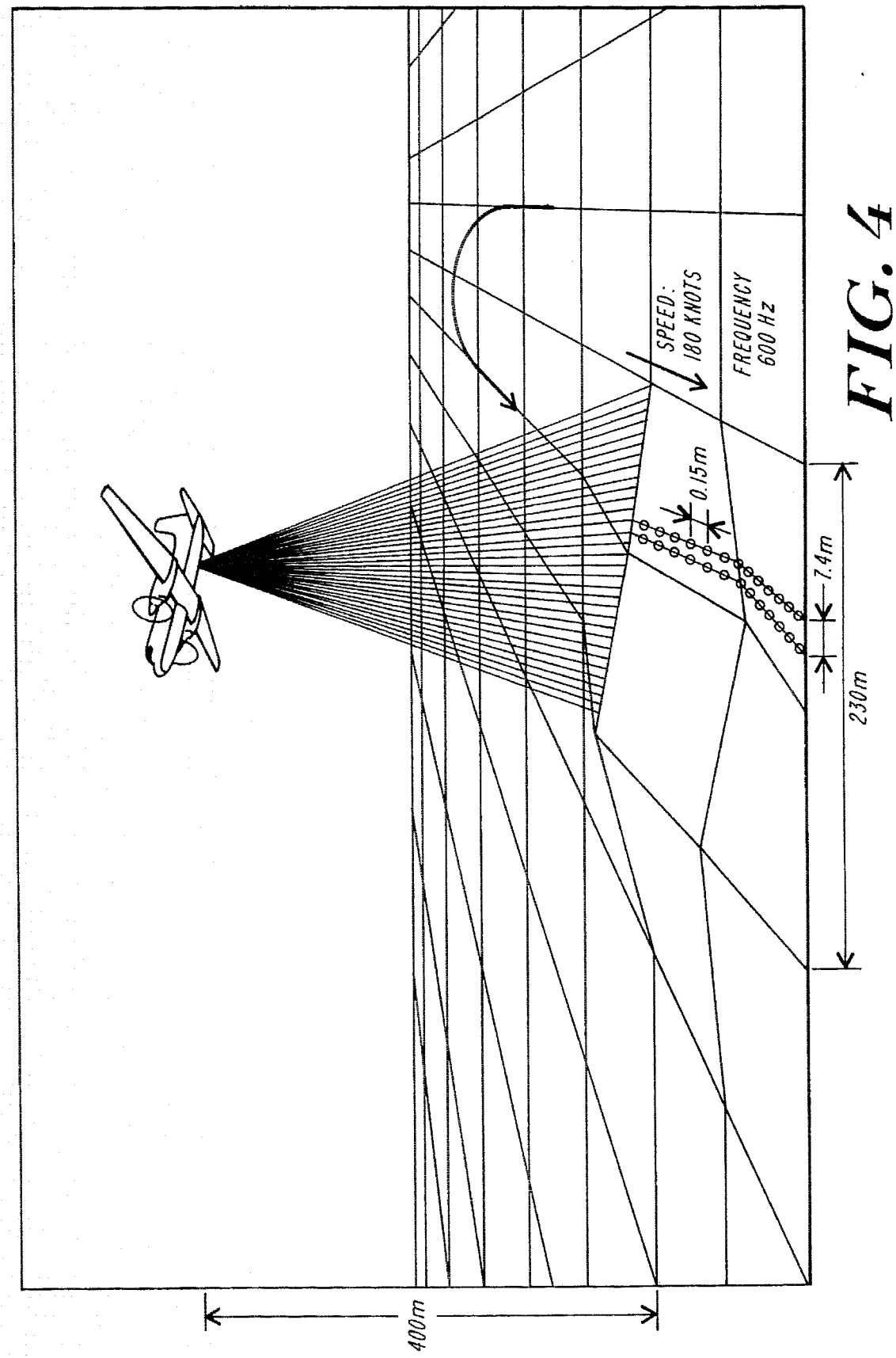
FIG. 4 shows another embodiment of a photographic aircraft having an assembly of laser units.

According to another embodiment of the method for a large scale mapping according to the present invention there is provided, in addition to the wide-angle reconnaissance camera and the tele-reconnaissance camera, a laser assembly comprising a group of laser units arranged with an equiangular distance in a line perpendicular to the flight direction to cover the width of said section of a range of a natural environment to be mapped. FIG. 4 shows a photographic airplane equipped with such a laser assembly scanning a section of the range to be mapped. The utilized lasers are pulsed lasers. Their pulse frequency is set in dependence on the speed of the aircraft over the ground, so as to have a measuring point about every 15 cm in the flight direction. As shown, a set of approximately 35 laser beams are directed in a fan shape across the flight axis, each beam being aimed approximately one degree to the side of the adjacent beams. A corresponding laser detector detects the reflected and scattered laser light to map a net of measurement points forming a profile of the surface to be measured and mapped. In order to distinguish the signals from the different laser units in the detector, each laser unit emits a laser beam coded differently with respect to the other laser beams, so that when it is observed by the laser detector, it will be correctly identified as to its position in the sequence. Each laser beam may be processed to provide a range (height) measurement, or because of the known angular spacing of the laser points, variations between apparent distances of the points on the ground may be processed to determine slight changes in height of the ground or objects thereon. When the aircraft height is known, variations in the height of each grid point is known exactly.

The digital surface profile information given by this laser assembly together with the determination of the aircraft position by satellite supported radio position determination (such as the GPOS location and navigation system) gives a very exact information about the surface profile which is fed to a computer and data storage system. In this manner a very precise map of surface topography underneath the reconnaissance aircraft is created, which could not in general be achieved by ground support measurements due to the accumulation of errors at each border of a map.

The interpretation of this data is later carried out with the help of the pictures taken by the reconnaissance camera and/or the tele-reconnaissance camera, which, as noted above, are preferably also indexed by time or aircraft position. The index information correlates these pictures taken with said cameras to locate them in the network or grid of the measuring points made with a laser assembly, thus identifying the location of points in the picture with an up to now unknown accuracy. Preferably, interpretation of the surface profile data is carried out by means of the photographic data to first identify any objects that are of no interest to the environmental survey, which may lead to false data, and to eliminate the grid coordinates of those artifacts directly. Such objects could be, for example, parked cars, houses or the like, which cause the laser-measured topographical data to have false bump unrelated to natural objects or to ground topography.

Beside the application of mapping parameters in natural environments described above, according to this embodiment, the method can also be used in an aircraft rolling on the ground at an airport to control the required power so that it rolls with constant speed independently of the inclination of the ground. The inclination can be calculated from the laser-evaluated surface profile to immediately calculate and adjust the power required to maintain a constant speed.

The range of flight altitudes within which the method according to this embodiment can be utilized is therefore from 0 m over ground to 2500 m. It is nevertheless preferred to stay within the range between zero and 565 m flight altitude.

The exemplary description of the method according to the invention, too, is not to be understood as being restrictive; it merely serves to explain the method according to the invention as defined in claim 1.

I claim:

1. A method for the large-scale mapping of parameters of multidimensional structures in natural environments, characterized in that the natural environment or range to be mapped or sections thereof are detected during first picture-taking flights at a flight altitude between about 150 and 500 m above ground by means of series aerial surveying pictures taken by reconnaissance cameras (2) in combination with tele-cameras (3) for making detailed images from the range section covered by said reconnaissance cameras (2), the series aerial surveying pictures are set with respect to their position in said range by means of orientation aids and evaluated using photogrammetric techniques, and the range data obtained of a structure are assigned to the coordinates of the structure in the range for selective retrieval.

2. The method according to claim 1, characterized in that the orientation aids consist of radio position determinations during the picture-taking flight which are triggered with the image-taking instants.

3. The method according to claim 1, characterized in that the tele-camera (3) is guided either automatically in accordance with a flight schedule using computer control, or free-handed by an operator.

4. The method according to claim 1, characterized in that during second picture-taking flights at flight altitudes of about 50 m above ground and at imaging scales of 1:500 and less surveying picture orientation series are taken by means of a reconnaissance camera (2), and individual structures are taken from several directions from above and from the side.

5. The method according to claim 1, characterized in that the photographic pictures are taken with black-and-white films.

6. The method according to claim 1, characterized in that, in time-fixed correlation, pictures of sections of the range are taken by means of different photographic cameras in a vertically downwardly and obliquely downwardly inclined fashion and substantially transversely of the direction of flight.

7. The method according to claim 1, characterized in that control of the flight track (FT) of the first and second picture-taking flights, respectively, and/or of adjustment of the laterally oriented cameras (2, 3) to a predetermined section of the range is effected via a video camera (4) oriented in the direction of flight (FR), said video camera having a display screen on which the vertical projection of the flight track (10), which is executed in the direction of flight, and orientation lines (11, 12) indicating the adjustment of the photographic cameras (2, 3) are overlapping the video picture taken.

8. The method according to claim 1, characterized in that two laterally oriented photographic cameras (2, 3) are used, one of which (2) is a wide-angle camera.

9. The method according to claim 1, characterized in that the orientation aids consist of series aerial surveying pictures taken with the conventional aerophotogrammetric techniques and oriented in the Gauss-Krüger net.

10. The method according to claim 9, characterized in that the series aerial surveying pictures are taken with vertically downwardly directed series surveying cameras (1) using an imaging scale of 1:2000 and less, and in that the image-taking instants of said series surveying cameras are triggered with those of the reconnaissance cameras (2) and the tele-camera (3), respectively, and optionally of a video camera (4), and with a picture-taking flight anlayzer.

11. The method according to claim 10, characterized in that a black-and-white film having an increased infrared sensitivity or an increased sensitivity for blue is used.

12. A photographic surveying camera arrangement in a photographic aircraft, in particular for taking the aerial photographs according to claim 1, comprising at least one first series surveying camera (1) directed vertically downwardly, characterized by at least one second surveying camera (2) oriented substantially transversely of the direction of flight obliquely downwardly, and by a video camera (4) provided in the direction of flight, into the display screen of which the flight track (FT, 10) and the orientation (11) projected in the direction of flight of the second surveying camera (2) are cross-faded, with the instants of image triggering of the first (1) and second (2) camera standing in a fixed time relation.

13. The arrangement according to claim 12, characterized in that a third surveying camera (3) oriented substantially vertically of the direction of flight and obliquely downwardly is provided, which is equipped with a telephoto lens, the second surveying camera (2) comprising a wide-angle lens for covering a larger section of the range.

14. The arrangement according to claim 12, characterized in that the image sequence frequency of the second and third surveying camera (2, 3), respectively, and the camera adjustments thereof are controlled via a distance meter oriented in the picture-taking direction of the cameras, coupled with the flying speed.

15. A method for large scale mapping of parameters of multidimensional structures located in natural environments, using wide angle stereo aerial photography, the method being characterized by the steps of:

a) photographing at least sections of a range of a natural environment to be mapped with a wide-angle reconnaissance camera during picture-taking flights, the wide-angle reconnaissance camera being inclined diagonally downward with respect to an axis of flight to produce a series of aerial survey pictures showing the sections, b) during the same picture taking flights photographing using a tele-reconnaissance camera inclined diagonally downward to make detailed images of at least portions to the sections shown in the series of aerial survey pictures, the detailed images showing in detail multi-dimensional structures located in said portions so that parameters of said structures may be determined therefrom, c) scanning said section of a range to be mapped with a laser assembly comprising a group of laser units arranged with an equiangular distance in a line perpendicular to the flight direction to cover the width of said section with equidistant measuring points with a frequency dependent on the flight speed to get a series of measuring points approximately every 15 cm in flight direction, d) combining the resultant surface profile data obtained by said laser scanning with radio position determination data (DGPS), and e) orienting said series of aerial survey pictures in the net of measuring points obtained by said laser scan by comparing details on said laser scan with those on said images.

16. A method according to claim 15, wherein each laser unit emits a differently coded laser signal.

17. A method according to claim 15, wherein the radio position determination is carried out by a ground transponder.

18. A method according to claim 15, wherein the sampling frequency of the laser units is between 200 and 1500 Hz.

19. A method according to claim 15, wherein 32 laser units are arranged with a respective angle of 1° between adjacent units.

20. A method according to claim 15, wherein the flight altitude is between 0 and 2500 m.

21. A method according to claim 15, wherein the flight altitude is between 0 and 565 m.

22. A method according to claim 15, wherein said wide-angle reconnaissance camera and/or said tele-reconnaissance camera are high resolution video cameras, respectively.

* * * * *

UNITED STATES PATENT AND TRADEMARK OFFICE
CERTIFICATE OF CORRECTION

PATENT NO. : 5,555,018
DATED : September 10, 1996
INVENTOR(S) : Heiko S. von Braun It is certified that error appears in the above-indentified patent and that said Letters Patent is hereby corrected as shown below:

Title page, item [76], inventor: replace "Heiko S. von Braun" with-- Heiko Schmidt von Braun--.

Signed and Sealed this

Fourteenth Day of January, 1997

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,555,018
DATED : September 10, 1996
INVENTOR(S) : Heiko Schmidt von Braun It is certified that error appears in the above-indentified patent and that said Letters Patent is hereby corrected as shown below:

In column 9, at line 34, replace "is executed in" with --is extended in--.

Signed and Sealed this

Twenty-first Day of July, 1998

*Attest:*

BRUCE LEHMAN

*Attesting Officer*  *Commissioner of Patents and Trademarks*